United States Patent
Song et al.

(10) Patent No.: US 12,425,821 B2
(45) Date of Patent: Sep. 23, 2025

(54) METHOD OF SHARING AND DELIVERING V2X SERVICE RELATED INFORMATION BY A SERVER AND AN RSU AND APPARATUS THEREFOR

(71) Applicant: LG ELECTRONICS INC., Seoul (KR)

(72) Inventors: Byoungkil Song, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 18/112,305

(22) Filed: Feb. 21, 2023

(65) Prior Publication Data
US 2024/0284150 A1  Aug. 22, 2024

(51) Int. Cl.
*H04W 4/40* (2018.01)

(52) U.S. Cl.
CPC ..................................... *H04W 4/40* (2018.02)

(58) Field of Classification Search
CPC ....................................................... H04W 4/40
See application file for complete search history.

(56) References Cited

U.S. PATENT DOCUMENTS

2020/0280842 A1* 9/2020 Liu ........................ H04L 9/3268
2023/0336566 A1* 10/2023 Odabaee ............... H04L 63/168

FOREIGN PATENT DOCUMENTS

| CN | 114430552 A | 5/2022 |
| KR | 10-2009-0046637 A | 5/2009 |
| KR | 10-1584001 B1 | 1/2016 |
| KR | 10-2016-0038091 A | 4/2016 |
| KR | 10-2019-0132513 A | 11/2019 |

\* cited by examiner

*Primary Examiner* — Samina F Choudhry
(74) *Attorney, Agent, or Firm* — Birch, Stewart, Kolasch & Birch, LLP

(57) ABSTRACT

A Road Side Unit (RSU) device can include a communication interface configured to transmit and receive messages with a server and a plurality of direct communication User Equipment (UE). Also, the RSU device can further include a controller configured to receive a first vehicle-to-everything (V2X) service related information item from the server, and in response to determining that signature processing is currently unavailable for the first V2X service related information item, continue to collect a plurality of V2X service related information items from the server until signature processing becomes available. When signature processing become available, the control is configured to perform signature processing for the first V2X service related information item and the plurality of V2X service related information items as a group of V2X information to generate second signature-processed V2X service related information, and transmit the second signature-processed V2X service related information to one direct communication UE.

20 Claims, 13 Drawing Sheets

: First subscription area

: Second subscription area

METHOD OF SHARING AND DELIVERING V2X SERVICE RELATED INFORMATION BY A SERVER AND AN RSU AND APPARATUS THEREFOR

BACKGROUND OF THE DISCLOSURE

Technical Field

The following disclosure relates to a wireless communication system, and more particularly, to a method and apparatus for sharing and delivering Vehicle-to-Everything (V2X) service related information by a server and a Road Side Unit (RSU) device.

Discussion of Related Art

Wireless communication systems are being widely deployed to provide various types of communication services, such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). Sidelink (SL) communication is considered as a solution of relieving the base station (BS) of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing radio access technologies (RATs). Accordingly, a communication system is under discussion, for which services or UEs sensitive to reliability and latency are considered. The next-generation radio access technology (RAT) in which evolved mobile broadband (eMBB), machine-type communication (MTC), and ultra-reliable, low-latency communication (URLLC) are considered is referred to as new RAT or new-radio (NR) communication. In NR communication, V2X communication may also be supported.

Also, when a Road Side Unit (RSU) device receives a large amount of V2X service related information items from a server in a short amount of time, signature processing capabilities provided by the RSU for the service related information items may become constrained and undesirable transmission delays may occur, and power consumption increases and the configuration of the system may become complicated. Therefore, it is desirable to derive a device and method for providing a common V2X service to UEs that can prevent impairment of signature processing capabilities and reduce power consumption.

SUMMARY OF THE DISCLOSURE

Technical Task

One technical task of the embodiments of the present disclosure is to provide a method of delivering information to an end user by a cloud server and an RSU in a manner of sharing the information collected by the cloud server and the RSU device by integrating a network (e.g., device-to-network) based V2X service and a UE-to-UE direct communication (e.g., device-to-device) based V2X service together. In addition, another technical task of embodiments is to provide a new message and algorithm thereof proposed as a solution in the event that messages to be delivered to an OBU by an RSU increase to cause signature-processing delay.

Technical Solutions

In one technical aspect of the present disclosure, provided is a Road Side Unit (RSU) device in a wireless communication system, the RSU device including a receiving unit receiving V2X service related information from a server, a control unit determining whether signature processing is available for the V2X service related information, and a transmitting unit transmitting the signature-processed V2X service related information to a direct communication User Equipment (UE), in which the control unit can collect a plurality of V2X service related information based on that the signature processing is not available and a plurality of the V2X service related information can be signed after the signature processing becomes available.

In another technical aspect of the present disclosure, provided is a method of operating a Road Side Unit (RSU) device in a wireless communication system, the method including receiving V2X service related information from a server, determining whether signature processing is available for the V2X service related information, and transmitting the signature-processed V2X service related information to a direct communication User Equipment (UE), in which the RSU device can collect a plurality of V2X service related information based on that the signature processing is not available and the RSU device can sign a plurality of the V2X service related information after the signature processing becomes available.

In a further technical aspect of the present disclosure, provided is a server in a wireless communication system, the server including a receiving unit receiving V2X service related information from a Soft V2X User Equipment (UE) and a transmitting unit transmitting the V2X service related information to a Road Side Unit (RSU) device, in which a plurality of V2X service related information including the V2X service related information can be collected by the RSU device based on that signature processing is not available for the V2X service related information and a plurality of the V2X service related information can be signed after the signature processing becomes available.

A plurality of the V2X service related information, which are collected after the signature processing is available, can be transmitted to the direct communication UE as a single merged message.

The merged message can include a value indicating a plurality of the V2X service related information and an ID and value of each of the plurality of the V2X service related information.

The V2X service related information can include Basic Safety Message (BSM) and Personal Safety Message (PSM).

The RSU device can transmit sensor detection information to the server.

The sensor detection information can include information of other objects non-participating in a V2X service within a detectable range.

The sensor detection information can be forwarded to a soft V2X UE through the server.

The server can be a Soft V2X cloud server.

The direct communication UE can be an embedded device supportive of at least one of 5G PC5 interface or IEEE 802.11p.

The direct communication UE can correspond to an On Board Unit (OBU).

The signature processing can be a signature based on an IEEE 1609.2 certificate.

Advantageous Effects

According to one embodiment of the present disclosure, service coverage can be expanded by integrating V2X services based on different communication systems into one. When an RSU device collects a plurality of V2X service information items as one group of information and then transmits the collected information as an entire package and provides one signature for the entire packer, the delay due to signature processing for security does not increase even if there are many information items to be delivered to an OBU.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE EMBODIMENTS

Figure 1:
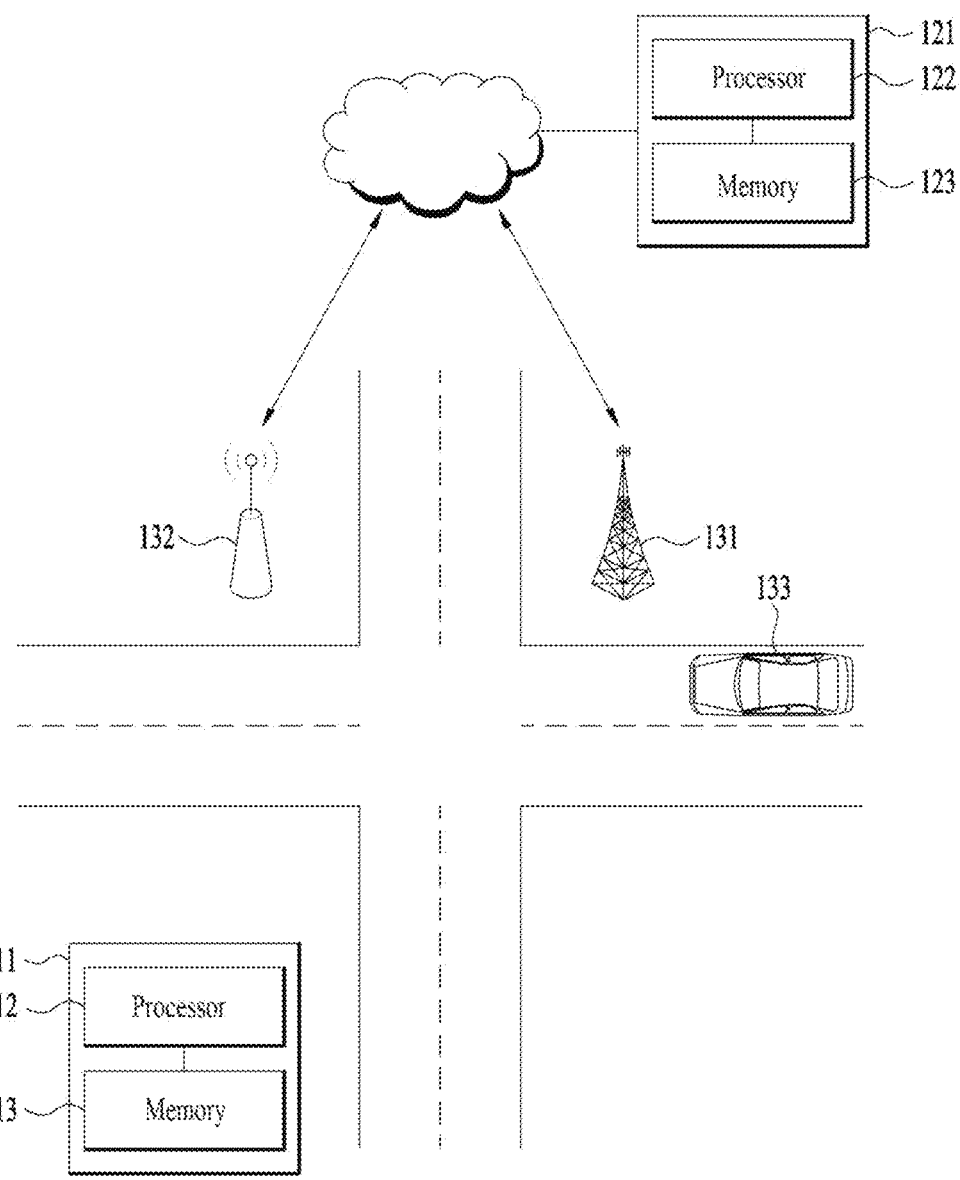
FIG. 1 is a diagram showing a system according to an embodiment of the present disclosure.

Hereinafter, the embodiments disclosed in the present specification will be described in detail with reference to the accompanying drawings, but the same or similar components are assigned the same reference numerals regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles can include automobiles, ships, aircraft, trains, motorcycles, bicycles, and the like. The vehicle can include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification can refer to a device that provides V2X functions and V2X services to users based on software, and can also be referred to as a SoftV2X device. The V2X device can be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device can be mounted on a vehicle or electronic device as an on-board unit (OBU) to provide V2X functions and services to the vehicle. A V2X device disposed inside or outside the vehicle can be connected to the vehicle through a wireless interface to provide V2X functions and V2X services to the vehicle.

In various embodiments of the present disclosure, "/" and "," should be interpreted as "and/or." For example, "A/B" may mean "A and/or B." Further, "A, B" may mean "A and/or B." Further, "A/B/C" may mean "at least one of A, B and/or C." Further, "A, B, C" may mean "at least one of A, B and/or C."

In various embodiments of the present disclosure, "or" should be interpreted as "and/or." For example, "A or B" can include "only A," "only B," and/or "both A and B." In other words, "or" should be interpreted as "additionally or alternatively."

FIG. 1 is a diagram showing a system according to an embodiment of the present disclosure.

Referring to FIG. 1, the system includes a UE 111 (or a V2X equipment/device) and a server 121 (or a V2X server). The UE 111 can communicate with the server 121 through a base station 131 or a Road Side Unit (RSU) device 132. The UE 111 can communicate with the base station 131, the Road Side Unit (RSU) device 132, a neighbor vehicle 133, and/or a neighbor UE using a wireless communication protocol. There is no limit to wireless communication protocols, including, for example, Dedicated Short Range Communications (DSRC), Cellular-V2X (C-V2X), Wi-Fi, BLUETOOTH, and/or 3$^{rd}$ Generation Partnership Project (3GPP) based Cellular Communication Protocol (e.g., Wideband Code Division Multiple Access (WCDMA), Long Term Evolution (LTE), New Radio (NR), etc.).

The server 121 receives one or more V2X messages from the UE 111 in a managed area. The server 121 can forward the one or more collected V2X messages to the UE 111 that is a current subscriber.

The V2X message is a message that is periodically or aperiodically transmitted by the UE 111 (or RSU device 132) to the server 121 and provides state information of the UE 111 (or a device managed by the RSU device 132). For example, the UE 111 can transmit ten V2X messages per second. The server 121 collects V2X messages from a multitude of UEs and forwards the V2X messages to the subscribing UE.

The following table shows an example of information elements included in the V2X message. Not all information elements are essential, and the name is just an example. Information elements can be added/changed/deleted depending on the policy or situation.

TABLE 1

| Name | Description |
| --- | --- |
| V2X ID | Temporary Identifier (ID) for identifying UE that transmits this message. This can be randomly selected by UE and periodically changed. The size can be 4 octets. |
| Position | Indicates the location of UE. This can include Latitude, Longitude, and Elevation. |
| Positional Accuracy | Includes quality of various parameters used to model the accuracy of positioning. |
| Velocity | Indicates the speed of UE. |
| Heading | Indicates the current heading (direction of motion) of UE. |
| Path History | Defines a geometric path reflecting UE's movement over some period of time and/or distance. |
| Acceleration | Indicates acceleration of UE. This can include a set of acceleration values for three orthogonal directions of UE: longitude axis, lateral axis, and vertical axis. |
| Device type | Indicates the type of UE. Examples: Pedestrians, vehicles, bicycles, etc. |
| Publishing area | Area where the UE sends V2X messages to the server. Publishing area includes one or more tiles at each level. |

A V2X message transmitted by the UE 111 to the server 121 is referred to as an Uplink (UL) V2X message, and a V2X message transmitted by the server 121 to the UE 111 is referred to as a Downlink (DL) V2X message.

The UE 111 can include a processor 112 and a memory 113. The processor 112 implements the function of the UE 111 and can include one or more software modules. The UE 111 can further include various additional devices according to various functions, such as a display, a user interface, a wireless modem, etc.

The server 121 includes computing hardware connected to the one or more base stations 131 and/or the RSU device 132 to provide V2X functions and services to UE 111. The server 121 can be a Mobile/multi-access Edge Computing (MEC)-based server or a centralized server. The server 121 can be referred to as another name, such as a geocast server, a soft server, etc. The server 121 can include a processor 122 and a memory 123. The processor 122 implements a function of the server 121 and can include one or more software modules.

The processor 112/122 can include Application-Specific Integrated Circuit (ASIC), Central Processing Unit (CPU), Application Processor (AP), Digital Signal Processors (DSPs), Digital Signal Processing Devices (DSPDs), Programmable Logic Devices (PLDs), Field Programmable Gate Arrays (FPGAs), microcontroller, chipset, logic circuit, data processor, and/or combinations thereof. In software implementation for the following embodiments, software codes for performing the functions described herein can be stored in the memory 113/123 and processed by the processor 112/122.

The memory 113/123 can store information accessible by the processor 112/122. The information can include instructions executable by the processor 112/122 and/or data processed by the processor. The memory 113/123 can include some form of computer-readable medium that operates to store information. For example, the memory 113/123 can include Read Only Memory (ROM), Random Access Memory (RAM), Digital Video Disc (DVD), optical disc, flash memory, Solid State Drive (SSD), hard drive, and combinations thereof.

Message Queuing Telemetry Transport (MQTT) is used as a message protocol between the UE 111 and the server 121, but this is only an example. Advanced Message Queuing Protocol (AMQP), Hypertext Transfer Protocol (HTTP), and/or vendor specific protocols can be used.

Now, the setting of an area for a V2X service will be described in more detail. Hereinafter, a tile refers to a geographical basic unit for setting a subscription area. Hereinafter, a quadrangle is shown as a tile shape, which is just an example. There are no restrictions on the shapes of tiles, such as polygons, circles, etc.

Figure 2:
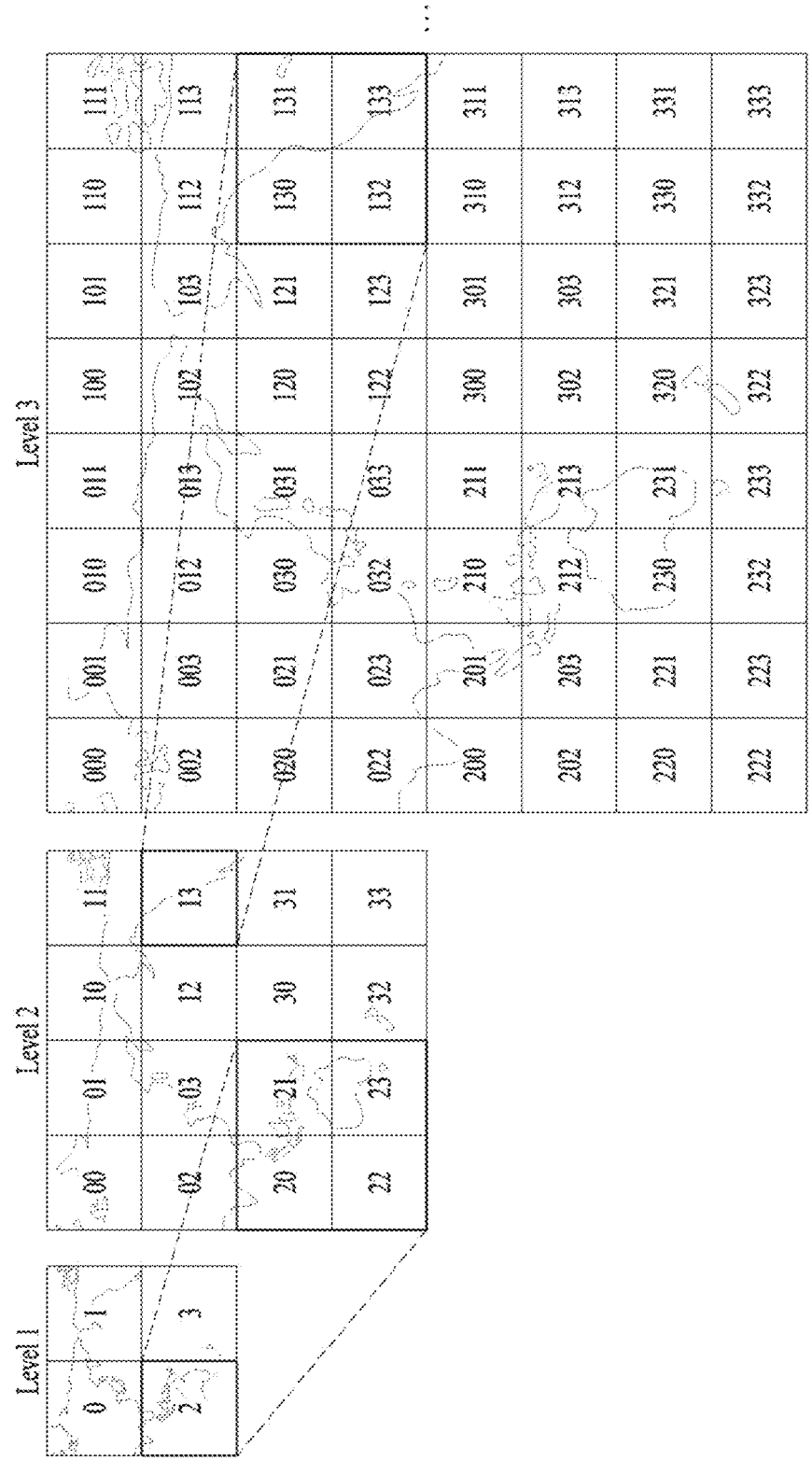
FIG. 2 is a diagram showing an example of a quadtree used tile according to an embodiment of the present disclosure.

FIG. 2 is a diagram showing an example of a quadtree used tile.

Referring to FIG. 2, the quadtree represents a partition of space in two dimensions by decomposing a map (e.g., world map) into four equal quadrants, subquadrants, and so on. A size of the quadrant varies according to a zoom level, and each quadrant corresponds to a tile. Here, the situations are shown where the levels are 1, 2, and 3. The larger the level, the smaller the size of the tile. At each level, a unique identifier is assigned to a tile. A tile ID can have the bit number corresponding to a level. For example, each internal node in the quadtree can have four children.

A UE can obtain an ID of a tile in which the UE is located based on its location information (e.g., latitude and longitude). The UE and/or server can adjust a size of an area by adjusting a level according to a situation.

In the following embodiment, areas for a V2X service are as follows.

Management area: An area managed by a server when one or more servers distributively manage an area to serve large-scale users or a large area. The management area includes one or more tiles.

Subscription area: An area where a UE has subscribed to a server. The subscription area can be referred to by other names such as a concerned area, an impact area, a geocast area, etc. The subscription area includes one or more tiles. The subscription area can be included in one management area, or can be defined over a plurality of management areas by a plurality of servers.

Publishing area: An area where a UE transmits a V2X message to a server. The publishing area can include one or more tiles at each level. The publishing area can indicate a tile in which the UE is currently located. A part or all of the publishing area can overlap the subscription area.

Figure 3:
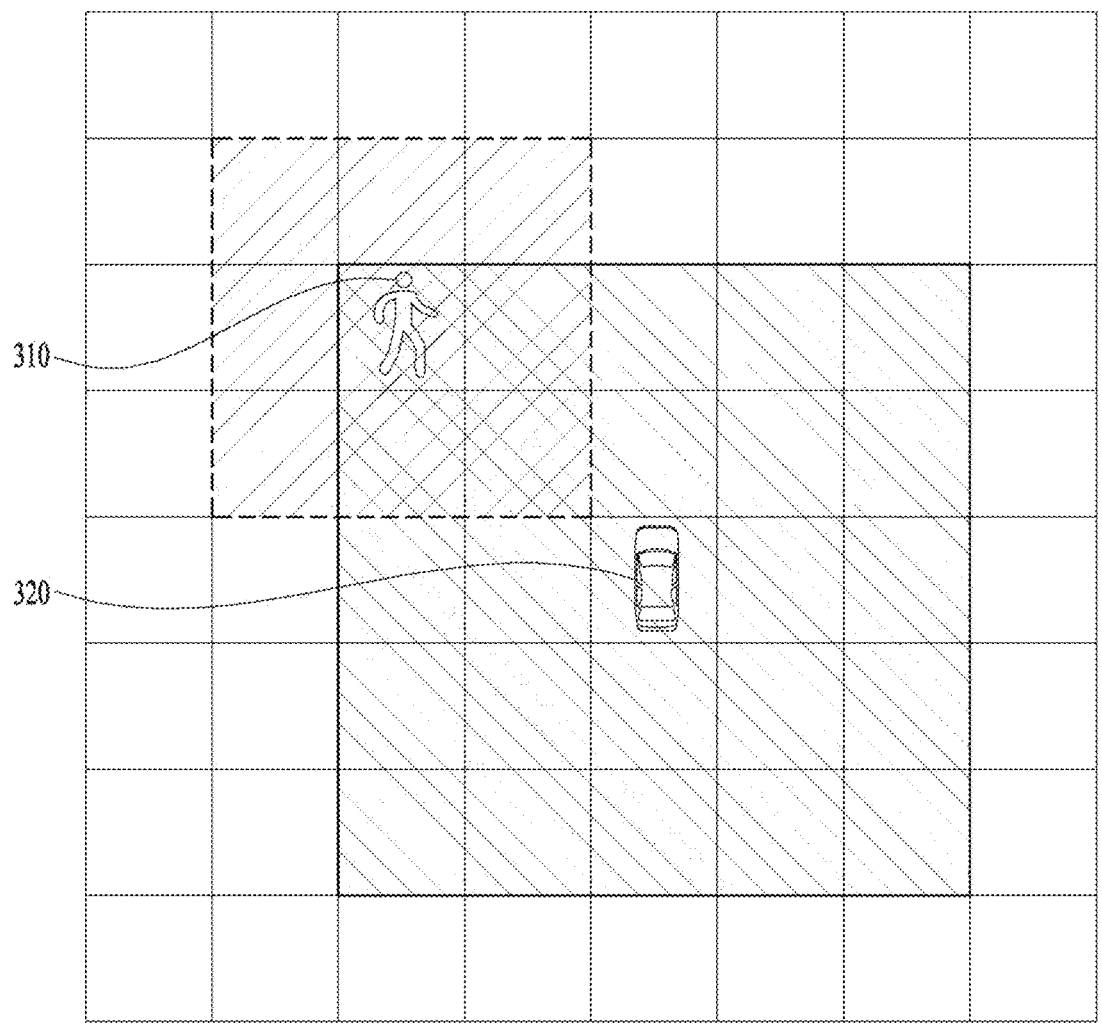
FIG. 3 shows one example of setting a subscription area according to an embodiment of the present disclosure.
Figure 3:
Figure 3:
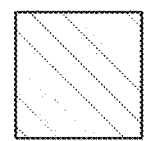

FIG. 3 shows one example of setting a subscription area.

Referring to FIG. 3, a first subscription area is set for a first UE 310 (e.g., the leftward sloping hashing around the person associated with first V2X device 310), and a second subscription area is set for a second UE 320 (e.g., the rightward sloping hashing around the vehicle associated with/corresponding to second V2X device 320). Each of the UEs can periodically or aperiodically set/change/delete the subscription area (e.g., when its location is changed). Each of the UEs can request the server to set/change/delete the subscription area.

In this example, the number of tiles included in the first subscription area is 9, and the number of tiles included in the second subscription area is 25, but there is no limit to the number of tiles included in the subscription area or the shape of the subscription area. The subscription area can include a tile in which the UE is located. Alternatively, the subscription area can include one or more tiles except for the tils in which the UE is located.

The first UE 310 can generate a first V2X message and periodically transmit the first V2X message to a server. The second UE 320 can generate a second V2X message and periodically transmit the second V2X message to the server.

The server can forward one or more V2X messages received in or around the subscription area to the UE associated with the subscription area.

A device for setting a subscription area can be referred to as a 'subscriber device'. A device for transmitting a V2X message to a server can be referred to as a 'publisher device'. A UE can be a subscriber device, a provider device, or both a subscriber device and a provider device. The server can forward V2X messages transmitted by provider devices in a management area to the subscriber device.

The server can deliver a V2X message of the provider device 'associated' with a subscription area of the subscriber device to the subscriber device. The provider device associated with the subscription area of the subscriber device can be referred to as a 'subscribed provider device'. The provider device associated with the subscription area of the subscriber device can satisfy at least one of the following conditions (i) to (iii), which include: (i) some or all of the publishing area of the provider device overlaps the subscription area of the subscriber device; (ii) some or all of the subscription area of the provider device overlap the subscription area of the subscriber device; and/or (iii) a location where the provider device transmits the V2X message is within the subscription area of the subscriber device.

According to the condition (i) or (iii), the server delivers a V2X message received within the first subscription area to the first UE 310. The server delivers a V2X message received in the second subscription area to the second UE 320.

Since the first UE 310 is located in the second subscription area, the server can forward the first V2X message to the second UE 320. The second UE 320 is a subscriber device, and the first UE 310 becomes a subscribed provider device.

Since the second UE 320 is not located in the first subscription area (which means that the condition (i) or the condition (iii) is not satisfied), the server does not forward the second V2X message to the first UE 310 (e.g., the person is in the vehicle's subscription area so the vehicle can receive V2X messages from the person, but the vehicle is not in the person's subscription area just yet so the person may not receive V2X messages from the vehicle, according to some situations or configurations). In other words, different areas or zones can be set for the first V2X device 310 and second V2X device 320, so that the second V2X device 320 is aware of the first V2X device 310, but the first V2X device 310 may not yet be aware of the second V2X device 320, since the first V2X device 310 has a much smaller subscription area. The second UE 320 is not a provider device of the first UE 310. However, if condition (ii) is considered, the second UE 320 can be a provider device of the first UE 310 (e.g., even if conditions (i) and (iii) are not met, the server can be configured to still deliver a message from the second V2X device to the first V2X device when condition (ii) is met).

Figure 4:
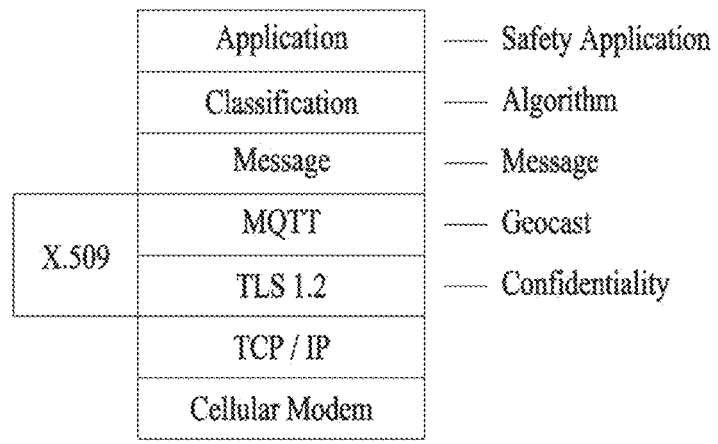
FIG. 4 is a diagram showing a SoftV2X protocol stack according to an embodiment of the present disclosure.

FIG. 4 is a diagram showing a SoftV2X protocol stack operable in a UE, a smartphone, etc. Each layer of the SoftV2X protocol stack will be described with reference to FIG. 4. Here, SoftV2X is one V2X communication method in which a method described below is used, and the following description is not limited to the term SoftV2X. In addition, other terms referring to a communication method corresponding to the following description can also be considered as corresponding to SoftV2X in the present disclosure.

Cellular Modem is a layer (e.g., physical layer or media layer) for a modem that uses cellular networks. A cellular network is a communication network configured and operated by dividing an area into several cells, where a cell means a divided area including a single base station. Cellular network communication technology can include 5G New RAT (NR), Long Term Evolution (LTE), and the like. In SoftV2X, unicast communication is performed unlike in the situation of V2X.

In SoftV2X protocol, a network/transport layer uses IP/TCP used for cellular networks.

Transport Layer Security (TLS) layer is intended to ensure confidentiality using transport layer security, and an authentication certificate uses X.509, a Public Key-based (PKI) ITU-T standard. In addition, SoftV2X protocol is configured to perform the geocast function of sending messages only to users in a specific area. To this end, Message Queuing Telemetry Transport (MQTT), which is an issue-subscription-based messaging protocol, is used.

Subsequently, SoftV2X uses the message defined in SAE J2735 (BSM, PSM, RSA, etc.). SAE J2735 defines signal specifications, such as messages, data frames, element formats, structures and the like for V2V/V2I communication, and the main messages are shown in Table 2 below.

TABLE 2

| Main Messages | Use range | Contents |
| --- | --- | --- |
| BSM (Basic Safety Message) | V2V | Provides overall safety-related information. Broadcasting communications with periodicity of 100 ms. |
| PVD (Probe Vehicle Data) | V2I | Delivers 'Prove data' collected on a vehicle to RSU. |
| MapData | I2V | Provides information on intersections and road topographic data. |
| SpaT (SinglePhaseAndTiming) | I2V | Used in conjunction with MapData to provide information on signal phase and time synchronization of movement at the intersection. |
| RTCMCorrections Real-Time Differential Correction Maritime) | I2V | Message to provide RTCM correction information. |
| PSM (PersonalSafetyMessage) | V2P | Provides information about pedestrians in danger range. |
| PDM (ProveDataManagement) | I2V | Message for managing PVD messages. |
| RSA (RoadSideAlert) | V2X | Supports generation of ad-hoc message from public safety vehicle and RSU. |
| SSM (SignalStatusMessage) | I2V | Used for response to Facility Operational Status Request. |
| SRM (SignalRequestMessage) | V2I | Message for vehicle entering intersection to obtain service information from signal controller. |
| TIM (TravelerInformationMessage) | I2V | Message that conveys information on various traffic information, unexpected situations, pre-road work, etc. |
| CSR (CommonSafetyRequest) | V2V | Request message for data support for safety information exchange. |
| EVA (EmergencyVehicleAlert) | V2X | Deliver information about emergency vehicle. |
| ICA (IntersectionVehicleAlert) | V2X | Deliver information about vehicle hazard conditions near intersections. |
| NMEACorrections | I2V | Used for transmitting message of initial GPS data format on DSRC channel. |
| testMessages00-15 | N/A | Used in customized message format for each use region. |
| Not Assigned | N/A | Assigned when adding new message content. |

Subsequently, a classification layer performs an algorithm to generate data necessary for risk determination. An application layer determines whether or not it is dangerous based on the data that raised Classification, thereby informing pedestrians and drivers carrying smartphones.

Figure 5:
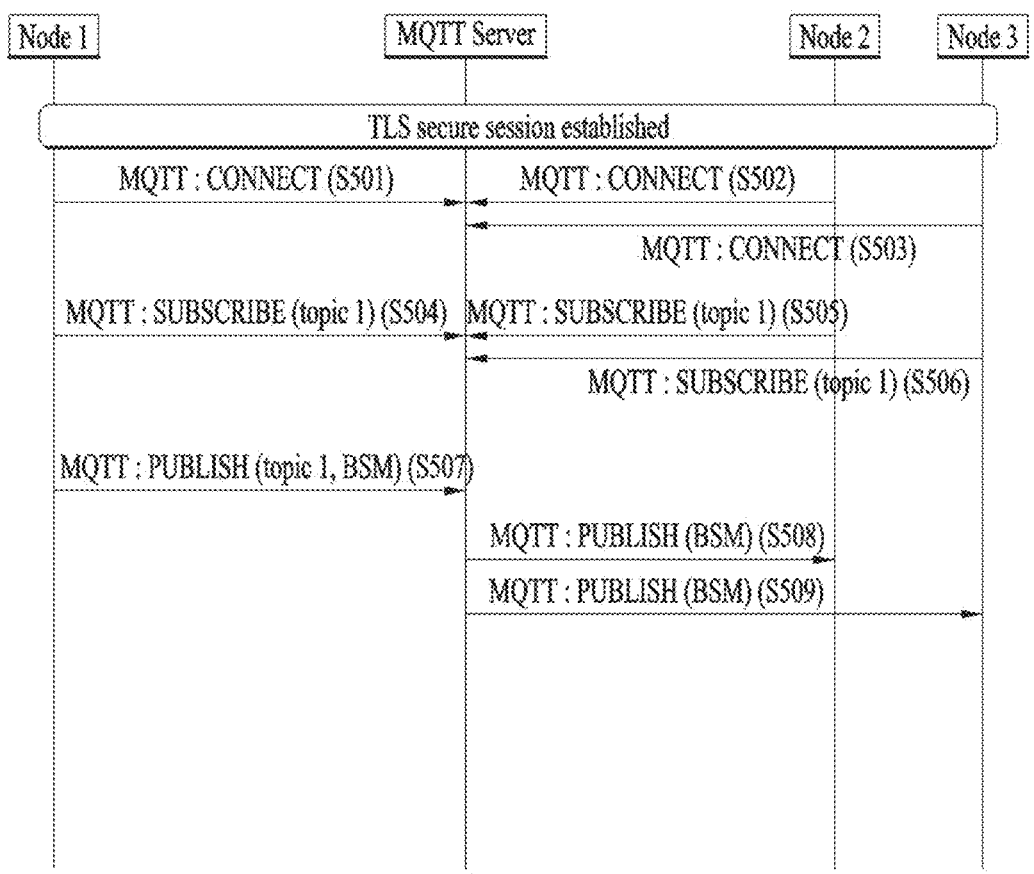
FIG. 5 is a flowchart showing an example of performing geocast using MQTT in SoftV2X according to an embodiment of the present disclosure.

FIG. 5 is a flowchart showing an example of performing geocast using MQTT in SoftV2X. In Legacy V2X, devices in the same region can naturally receive messages (such as BSM, etc.) through a broadcast channel. However, since cellular networks use unicast communication, SoftV2X uses MQTT to perform unicast transmission to all devices in the same region, resulting in broadcast-like effects.

For MQTT communication, a secure session is first set up between all nodes and a server using TLS. Each node can first perform a CONNECT process and then perform a SUBSCRIBE process on a specific topic (S501 to S503 of FIG. 5). In this situation, a topic is selected differently depending on a region. A map can be divided by a tile, and the same topic value can be given to each tile. Therefore, each of the nodes performs SUBSCRIBE by selecting a topic according to a tile in which the corresponding node is located. For example, in FIG. 5, Nodes 1, 2, and 3 were all present in the same tile (region and subscribed to the same topic 1 (S504 to 506 in FIG. 5).

When the Node 1 transmits PUBLISH (BSM) to the MQTT server (S507), the server delivers the PUBLISH (BSM) in a unicast manner to all nodes having subscribed to the topic1 (S508, S509). Each of the Node 2 and the Node 3 performs Classification and Threat Assessment based on the received BSM message. If detecting danger, the corresponding node informs smartphone users (e.g., pedestrian and driver) of the detection of the danger. A car or vehicle transmits BSM and a pedestrian transmits PSM, and these messages basically contain information (e.g., ID, location, speed, acceleration, direction, etc.) necessary for danger detection.

Meanwhile, in a network (device to network) based V2X service, user equipments can access a cellular network and receive a V2X service from a cloud server. In addition, in a UE-to-UE direct communication (device to device) based V2X service, a UE (OBU) can receive a V2X service by communicating with other neighbor UEs or a Road Side Unit (RSU) device.

A method mainly mentioned as a way to integrate two kinds of services is to support both communication systems by a UE (see WO2017052488A1, 2017 Mar. 30). However, compared to a UE supporting a single communication system only, a UE supporting two kinds of communication systems is disadvantageous in that the structure of the UE is complicated and power consumption increases. Therefore, it is desirable to derive a method for providing a common V2X service to UEs respectively supporting separate communication systems, which will be described in an embodiment of the present disclosure below.

A Road Side Unit (RSU) (device) according to an embodiment of the present disclosure includes a receiving unit (e.g., receiver) receiving V2X service related information from a server (e.g., a cloud server), a control unit (e.g., controller, processor) determining whether signature processing of the V2X service related information is available; and a transmitting unit (e.g., transmitter) transmitting the signature-processed V2X service related information to a direct communication UE (e.g., an On Board Unit (OBU)), in which when the signature processing of the V2X service related information not available, the control unit can collect a plurality of V2X service related information and then after the signature processing is available, the control unit can perform signature processing on a plurality of the V2X service related information. Here, the signature processing can be a signature based on the IEEE 1609.2 certificate. Also, the receiving unit and the transmitting unit can be implemented as a transceiver or a communication interface.

Figure 6:
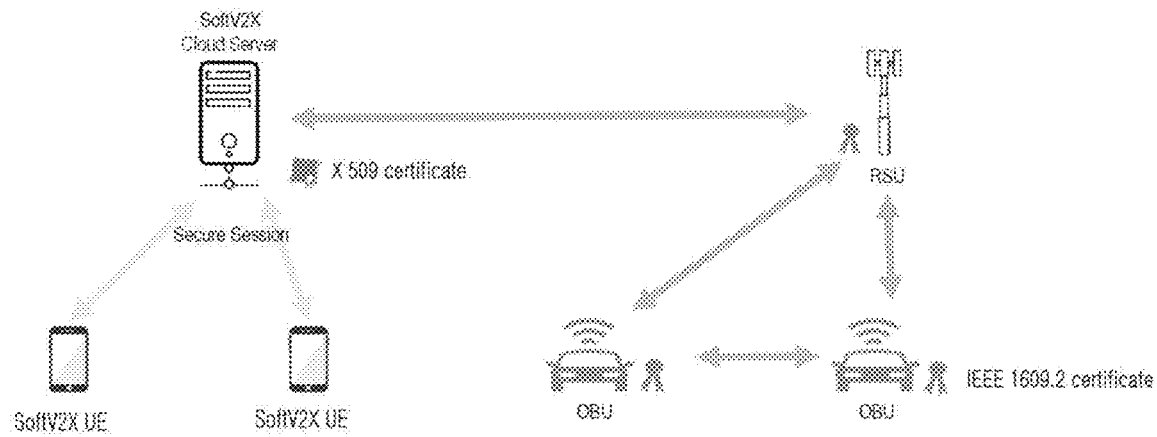
FIGS. 6 to 9 are diagrams to describe embodiments of the present disclosure.

A plurality of the V2X service related information, which are collected after signature processing becomes available, can be transmitted to the direct communication UE as a single merged message. Here, the merged message can include a value indicating a plurality of the V2X service related information and an ID and value of each of a plurality of the V2X service related information. That is, as shown in FIG. 6, a cloud server can collect the V2X service related information received from Soft V2X UEs and transmit the collected information to the RSU device, and the RSU device can transmit the collected information to the OBUs. This is to transmit the V2X service related information of a multitude of network based UEs to neighbor OBUs with a minimum delay. Since the signature processing based on IEEE 1609.2 certificates is processed sequentially using a Hardware Security Module (HSM), as the number of the network based UEs increases, the number and amount of the V2X service related information delivered increases, which can eventually delay a timing of being delivered to the OBU due to accumulation of the signature processing. In other words, messages can arrived faster than the signature processing can handle them. As a solution to this, instead of individually signing each of the V2X service related information communications from multiple UEs, in order to minimize delay, they can be collected together as one group and then performing signature processing them once, as one group.

That is, by configuring it as described above, service coverage can be expanded by integrating V2X services based on different communication systems into one package or one group of information. When the RSU device collects and transmits V2X service information as one communication package, the delay due to signature processing for security does not increase even if there is more information to be delivered to the OBU.

Figure 7:
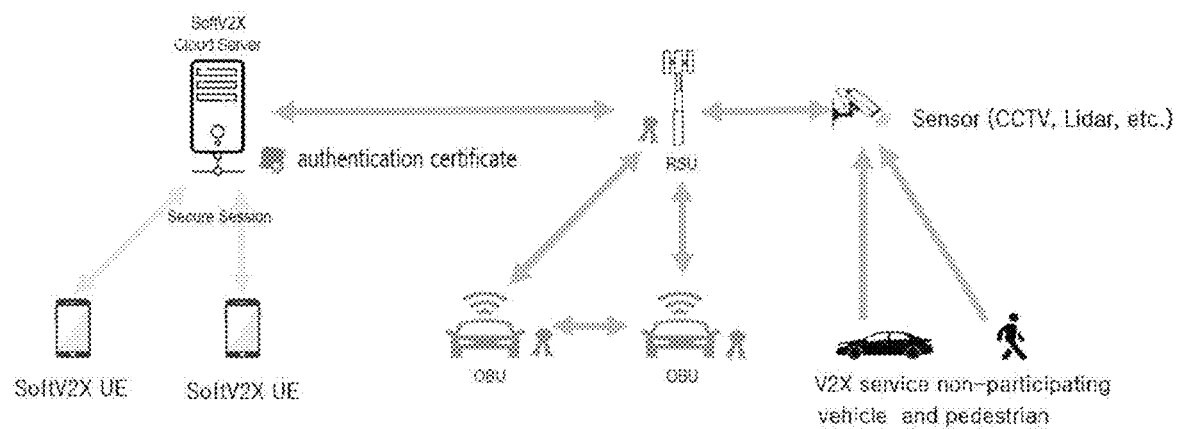

Subsequently, the RSU device can transmit sensor detection information to the server. The sensor detection information can include information on other objects that have not participated in the V2X service within a detectable range. That is, as shown in FIG. 6, the RSU device can collect V2X service related information received from OBUs and forward the collected information to the cloud server, and the cloud server can forward the collected information to the Soft V2X UEs. In addition, as illustrated in FIG. 7, the RSU device can extract information of V2X service non-participants from the object information detected and forwarded by the sensor and forward the extracted information to the OBUs (Sensor Data Sharing Message among SAE J2735 DSRC messages). The sensor detection information can be forwarded to the Soft V2X UE through the server. That is, the RSU device can extend the V2X service to the Soft V2X UE by forwarding the information to the cloud server as well.

The server can include a Soft V2X cloud server, and the direct communication UE can include an embedded device that supports at least one of 5G PC5 interface and IEEE 802.11p.

Meanwhile, the V2X service related information can include a Basic Safety Message (BSM) and a Personal Safety Message (PSM). In accordance with the SAE J2735 DSRC message set specification, the V2X service related information delivered from the cloud server is a Personal Safety Message (PSM) for pedestrians or a Basic Safety Message (BSM) for vehicles. In addition, other messages defined in the SAE J2735 DSRC message set standard can be delivered as needed. All these messages are the subsets of the ASN.1 format 'MessageFrame'.

Here, if the ASN of the SAE J2735 DSRC message set standard declares 'MergedMessages' including multiple 'MessageFrame' as one of the message types, various messages can be grouped into one message as shown in Table 3 below, which can correspond to one merged message in the above description.

In Table 3, M is a number assigned to distinguish it from other messages when registered in the specification, and N is the maximum number of messages that can be collected.

TABLE 3

```
MessageTypes MESSAGE-ID-AND-TYPE ::= {
~ omitted ~
    { MergedMessages           IDENTIFIED BY mergedMessages } |
~ omitted ~
}
DSRCmsgID ::=
~ omitted ~
    mergedMessages             DSRCmsgID ::= M
MergedMessages ::=SEQUENCE {
    messages                   MessageFrameList,
    ...
}
MessageFrameList   ::= SEQUENCE (SIZE(1..N)) OF MessageFrame
```

As described above, FIG. 8 shows a flowchart for solving a signature processing delay problem through HSM when there is a lot of information to be transmitted by an RSU to an OBU.

Figure 8:
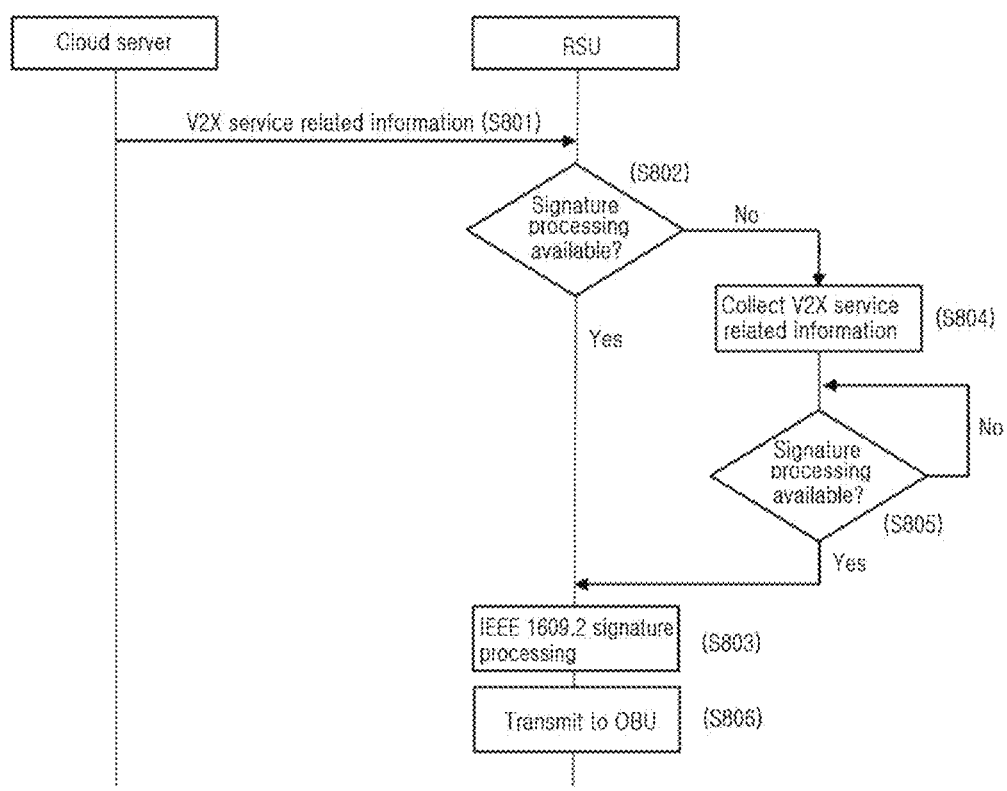

Referring to FIG. 8, an RSU receives V2X service related information from a cloud server (S801), and determines whether signature processing is available (S802).

If the signature processing is available immediately, it can be performed (S803). Otherwise, V2X service related information collection can be started (S804). Thereafter, by determining again whether the signature processing is available (S805), the RSU device can sign all of the service related information collected so far at once and transmit it to an OBU together in one large communication transmission (S806). A new message can be required to sign the collected service related information at once, and a (merged) message as illustrated in Table 3 can be used.

Figure 9:
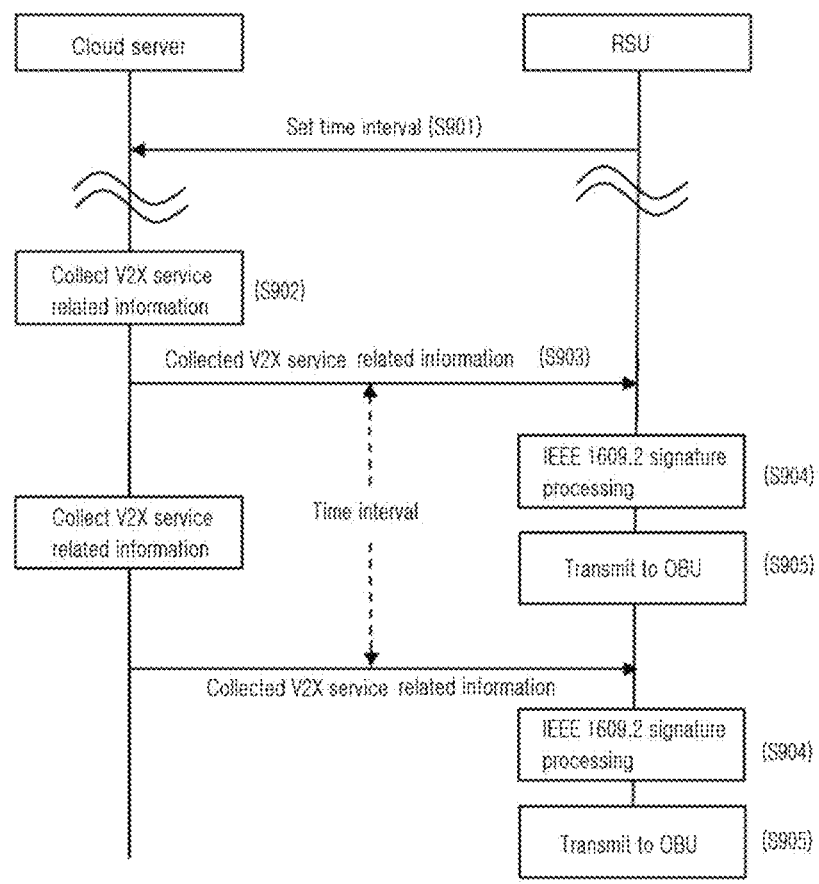

FIG. 9 shows a flowchart according to another embodiment for solving the problem of a delay in signature processing through HSM when there is a lot of information to be transmitted by an RSU to an OBU.

Referring to FIG. 9, an RSU informs a cloud server of an appropriate time interval in consideration of a time delay due to signature processing (S901). The cloud server can collect V2X service related information (S902) and deliver the V2X service related information collected (every hour) so far to the RSU device at once, on a periodic basis (S903).

The RSU device can sign the collected service related information received from the cloud server at once (S904) and transmit it to an OBU (S905). Here, a new message can be required to sign the collected service related information at once, and a (merged) message as illustrated in Table 3 can be used.

According to an embodiment of the present disclosure, an RSU transmits V2X service related information transmitted by Soft V2X. UE(s) to an OBU in the form of a single merged message (e.g., one large message including many items of information), so it will be possible to determine whether to apply the merge processing. Here, the single merged message can be, for example, a message as illustrated in Table 3. However, the present disclosure is not limited thereto, and various types of messages including at least one V2X service related information transmitted by the Soft V2X UE(s) are also included in the scope of the present disclosure.

In the above description, a Soft V2X UE can access a wireless network with a smartphone or an embedded device supporting 4G LTE or 5G Uu interface and receive a V2X service through a cloud server. The Soft V2X UE can create a security session based on the X.509 certificate with the cloud server and exchange V2X service related information. The V2X service related information can include Basic Safety Message (BSM) and Personal Safety Message (PSM) in Intelligence Transportation Systems relevant standard documents (SAE J2735 DSRC message set). Direct communication UEs are embedded devices that support IEEE 802.11p or 5G PC5 interfaces and can exchange V2X service related information with each other using short-range communication. (SAE J2735 DSRC message set). For security purposes, each UE can perform a signature and verification procedure based on the embedded IEEE 1609.2 certificate in V2X information transmission and reception.

In relation to the above description, a method of operating a Road Side Unit (RSU) device includes receiving V2X service related information from a server; determining whether signature processing is available for the V2X service related information, transmitting the signature-processed V2X service related information to a direct communication UE, in which the RSU device collects a plurality of V2X service related information items based on a situation where signature processing is yet not available and then the RSU device can sign the plurality of the V2X service related information items after the signature processing becomes available.

In addition, a server includes a receiving unit receiving V2X service related information from a Soft V2X UE and a transmitting unit transmitting the V2X service related information to a Road Side Unit (RSU) device, in which a plurality of V2X service related information items are collected by the RSU device based on signature processing not being available yet for the V2X service related information items, and then the plurality of the V2X service related information items can be signed once the signature processing becomes available.

Examples of Communication Systems Applicable to the Present Disclosure

The various descriptions, functions, procedures, proposals, methods, and/or operational flowcharts of the present disclosure described in this document can be applied to, without being limited to, a variety of fields requiring wireless communication/connection (e.g., 5G) between devices.

Hereinafter, a description will be given in more detail with reference to the drawings. In the following drawings/description, the same reference symbols can denote the same or corresponding hardware blocks, software blocks, or functional blocks unless described otherwise.

Figure 10:
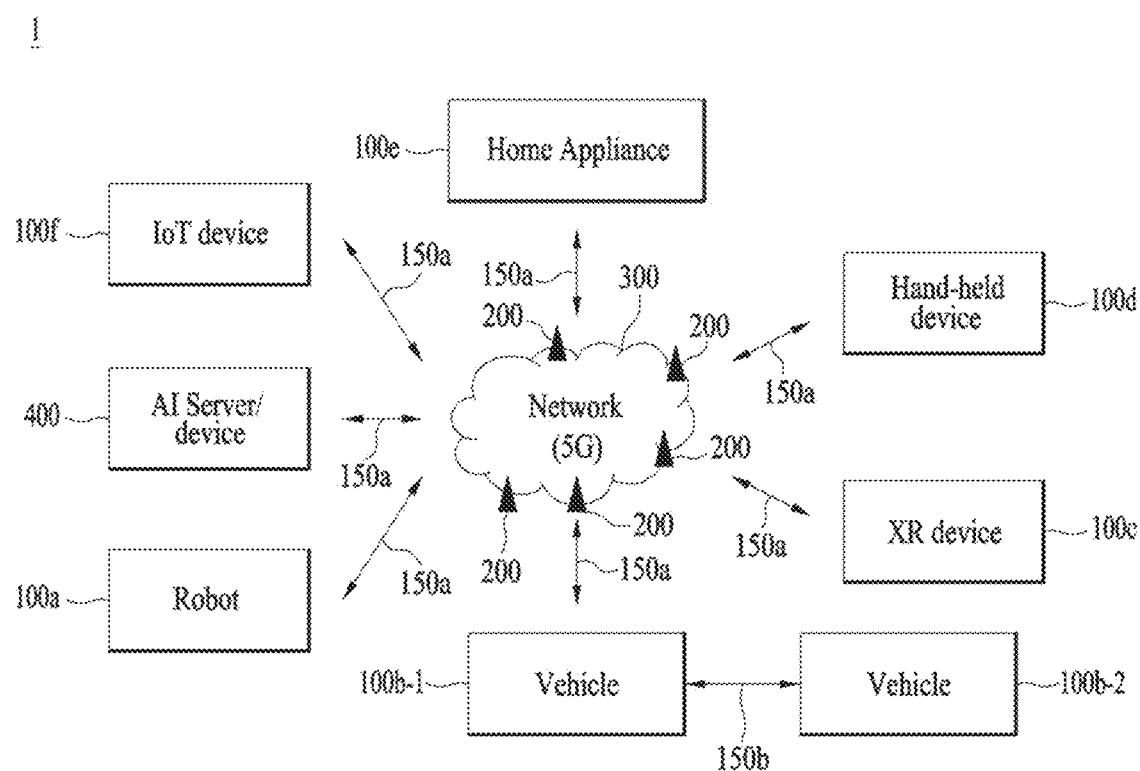
FIGS. 10 to 13 are diagrams illustrating various devices and examples according to embodiments of the present disclosure.

FIG. 10 illustrates a communication system 1 applied to the present disclosure.

Referring to FIG. 10, a communication system 1 applied to the present disclosure includes wireless devices, BSs, and a network. Herein, the wireless devices represent devices performing communication using RAT (e.g., 5G NR or LTE) and can be referred to as communication/radio/5G devices. The wireless devices can include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles can include a vehicle having a wireless communication function, an autonomous driving vehicle, and a vehicle capable of performing communication between vehicles. Herein, the vehicles can include an unmanned aerial vehicle (UAV) (e.g., a drone). The XR device can include an augmented reality (AR)/virtual reality (VR)/mixed reality (MR) device and can be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device can include a smartphone, a smartpad, a wearable device (e.g., a smartwatch or a smartglasses), and a computer (e.g., a notebook). The home appliance can include a TV, a refrigerator, and a washing machine. The IoT device can include a sensor and a smartmeter. For example, the BSs and the network can be implemented as wireless devices and a specific wireless device 200a can operate as a BS/network node with respect to other wireless devices.

The wireless devices 100a to 100f can be connected to the network 300 via the BSs 200. An AI technology can be applied to the wireless devices 100a to 100f and the wireless devices 100a to 100f can be connected to the AI server 400 via the network 300. The network 300 can be configured using a 3G network, a 4G (e.g., LTE) network, or a 5G (e.g., NR) network. Although the wireless devices 100a to 100f can communicate with each other through the BSs 200/network 300, the wireless devices 100a to 100f can perform direct communication (e.g., sidelink communication) with each other without passing through the BSs/network. For example, the vehicles 100b-1 and 100b-2 can perform direct communication (e.g. V2V/V2X communication). The IoT device (e.g., a sensor) can perform direct communication with other IoT devices (e.g., sensors) or other wireless devices 100a to 100f.

Wireless communication/connections 150a, 150b, or 150c can be established between the wireless devices 100a to 100f/BS 200, or BS 200/BS 200. Herein, the wireless communication/connections can be established through various RATs (e.g., 5G NR) such as UL/DL communication 150a, sidelink communication 150b (or, D2D communication), or inter BS communication (e.g., relay, integrated access backhaul (IAB)). The wireless devices and the BSs/the wireless devices can transmit/receive radio signals to/from each other through the wireless communication/connections 150a and 150b. For example, the wireless communication/connections 150a and 150b can transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, can be performed based on the various proposals of the present disclosure.

Examples of Wireless Devices Applicable to the Present Disclosure

Figure 11:
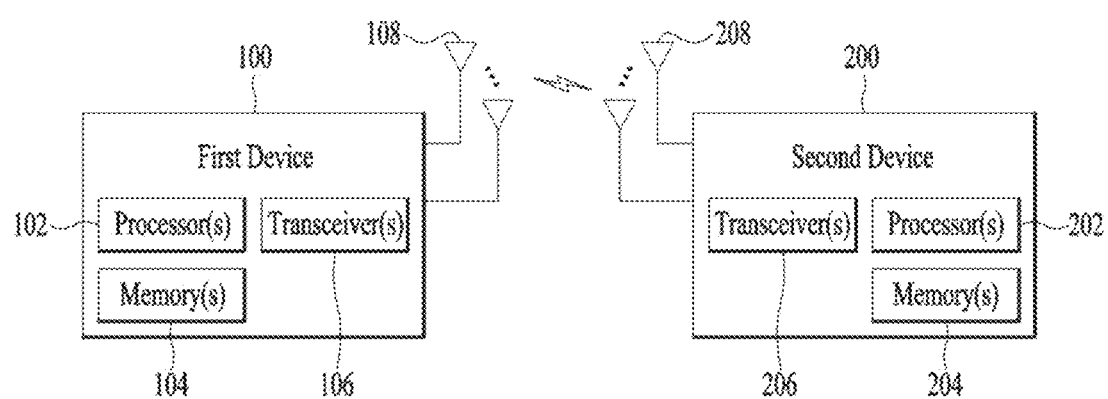

FIG. 11 illustrates wireless devices according to embodiments of the present disclosure.

Referring to FIG. 11, a first wireless device 100 and a second wireless device 200 can transmit radio signals through a variety of RATs (e.g., LTE and NR). Herein, the first wireless device 100 and the second wireless device 200 can correspond to one of the wireless devices and the BS 200 of FIG. 10 and/or two of the wireless devices of FIG. 10.

The first wireless device 100 can include one or more processors 102 and one or more memories 104 and additionally further include one or more transceivers 106 and/or one or more antennas 108. The processor(s) 102 can control the memory(s) 104 and/or the transceiver(s) 106 and can be configured to implement the descriptions, functions, procedures, proposals, methods, and/or operational flowcharts disclosed in this document. For example, the processor(s) 102 can process information within the memory(s) 104 to generate first information/signals and then transmit radio signals including the first information/signals through the transceiver(s) 106. The processor(s) 102 can receive radio signals including second information/signals through the transceiver 106 and then store information obtained by processing the second information/signals in the memory(s) 104. The memory(s) 104 can be connected to the processor(s) 102 and can store a variety of information related to operations of the processor(s) 102. For example, the memory(s) 104 can store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 can be a part of a communication modem/circuit/chip designed to implement RAT (e.g., LTE or NR). The transceiver(s) 106 can be connected to the processor(s) 102 and transmit and/or receive radio signals through one or more antennas 108. Each of the transceiver(s) 106 can include a transmitter and/or a receiver. The transceiver(s) 106 can be interchangeably used with Radio Frequency (RF) unit(s). In the present disclosure, the wireless device can represent a communication modem/circuit/chip.

The second wireless device 200 can include one or more processors 202 and one or more memories 204 and additionally further include one or more transceivers 206 and/or one or more antennas 208. The processor(s) 202 can control the memory(s) 204 and/or the transceiver(s) 206 and can be configured to implement the descriptions, functions, procedures, proposals, methods, and/or operational flowcharts disclosed in this document. For example, the processor(s) 202 can process information within the memory(s) 204 to generate third information/signals and then transmit radio signals including the third information/signals through the transceiver(s) 206. The processor(s) 202 can receive radio signals including fourth information/signals through the transceiver(s) 106 and then store information obtained by processing the fourth information/signals in the memory(s) 204. The memory(s) 204 can be connected to the processor(s) 202 and can store a variety of information related to operations of the processor(s) 202. For example, the memory(s) 204 can store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 can be a part of a communication modem/circuit/chip designed to implement RAT (e.g., LTE or NR). The transceiver(s) 206 can be connected to the processor(s) 202 and transmit and/or receive radio signals through one or more antennas 208. Each of the transceiver(s) 206 can include a transmitter and/or a receiver. The transceiver(s) 206 can be interchangeably used with RF unit(s). In the present disclosure, the wireless device can represent a communication modem/circuit/chip.

Hereinafter, hardware elements of the wireless devices 100 and 200 will be described more specifically. One or more protocol layers can be implemented by, without being limited to, one or more processors 102 and 202. For example, the one or more processors 102 and 202 can implement one or more layers (e.g., functional layers such as PHY, MAC, RLC, PDCP, RRC, and SDAP). The one or more processors 102 and 202 can generate one or more Protocol Data Units (PDUs) and/or one or more service data unit (SDUs) according to the descriptions, functions, procedures, proposals, methods, and/or operational flowcharts disclosed in this document. The one or more processors 102 and 202 can generate messages, control information, data, or information according to the descriptions, functions, procedures, proposals, methods, and/or operational flowcharts disclosed in this document. The one or more processors 102 and 202 can generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 can receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 can be referred to as controllers, microcontrollers, microprocessors, or microcomputers. The one or more processors 102 and 202 can be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) can be included in the one or more processors 102 and 202. The descriptions, functions, procedures, proposals, methods, and/or operational flowcharts disclosed in this document can be implemented using firmware or software and the firmware or software can be configured to include the modules, procedures, or functions. Firmware or software configured to perform the descriptions, functions, procedures, proposals, methods, and/or operational flowcharts disclosed in this document can be included in the one or more processors 102 and 202 or stored in the one or more memories 104 and 204 to be driven by the one or more processors 102 and 202. The descriptions, functions, procedures, proposals, methods, and/or operational flowcharts disclosed in this document can be implemented using firmware or software in the form of code, commands, and/or a set of commands.

The one or more memories 104 and 204 can be connected to the one or more processors 102 and 202 and store various types of data, signals, messages, information, programs, code, instructions, and/or commands. The one or more memories 104 and 204 can be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 can be located at the interior and/or exterior of the one or more processors 102 and 202. The one or more memories 104 and 204 can be connected to the one or more processors 102 and 202 through various technologies such as wired or wireless connection.

The one or more transceivers 106 and 206 can transmit user data, control information, and/or radio signals/channels, mentioned in the methods and/or operational flowcharts of this document, to one or more other devices. The one or more transceivers 106 and 206 can receive user data, control information, and/or radio signals/channels, mentioned in the descriptions, functions, procedures, proposals, methods, and/or operational flowcharts disclosed in this document, from one or more other devices. For example, the one or more transceivers 106 and 206 can be connected to the one or more processors 102 and 202 and transmit and receive radio signals. For example, the one or more processors 102 and 202 can perform control so that the one or more transceivers 106 and 206 can transmit user data, control information, or radio signals to one or more other devices. The one or more processors 102 and 202 can perform control so that the one or more transceivers 106 and 206 can receive user data, control information, or radio signals from one or more other devices. The one or more transceivers 106 and 206 can be connected to the one or more antennas 108 and 208 and the one or more transceivers 106 and 206 can be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas can be a plurality of physical antennas or a plurality of logical antennas (e.g., antenna ports). The one or more transceivers 106 and 206 can convert received radio signals/channels etc. from RF band signals into baseband signals in order to process received user data, control information, radio signals/channels, etc. using the one or more processors 102 and 202. The one or more transceivers 106 and 206 can convert the user data, control information, radio signals/channels, etc. processed using the one or more processors 102 and 202 from the base band signals into the RF band signals. To this end, the one or more transceivers 106 and 206 can include (analog) oscillators and/or filters.

Figure 12:
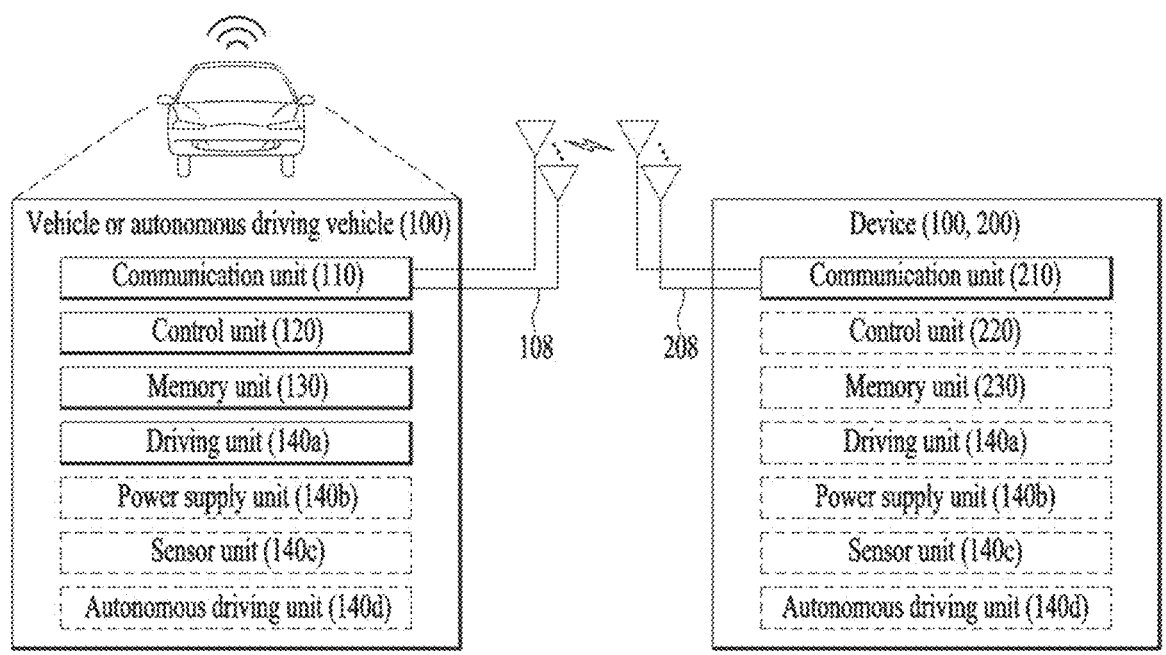

Examples of a Vehicle or an Autonomous Driving Vehicle Applicable to the Present Disclosure FIG. 12 illustrates a vehicle or an autonomous driving vehicle according to an embodiment of the present disclosure. The vehicle or autonomous driving vehicle can be implemented by a mobile robot, a car, a train, a manned/unmanned aerial vehicle (AV), a ship, etc.

Referring to FIG. 12, a vehicle or autonomous driving vehicle 100 can include an antenna unit 108, a communication unit 110 (e.g., transceiver), a control unit 120 (e.g., controller or processor), a driving unit 140a, a power supply unit 140b, a sensor unit 140c, and an autonomous driving unit 140d. The antenna unit 108 can be configured as a part of the communication unit 110.

The communication unit 110 can transmit and receive signals (e.g., data and control signals) to and from external devices such as other vehicles, BSs (e.g., gNBs and road side unit devices), and servers. The control unit 120 can perform various operations by controlling elements of the vehicle or the autonomous driving vehicle 100. The control unit 120 can include an ECU. The driving unit 140a can cause the vehicle or the autonomous driving vehicle 100 to drive on a road. The driving unit 140a can include an engine, a motor, a powertrain, a wheel, a brake, a steering device, etc. The power supply unit 140b can supply power to the vehicle or the autonomous driving vehicle 100 and include a wired/wireless charging circuit, a battery, etc. The sensor unit 140c can acquire a vehicle state, ambient environment information, user information, etc. The sensor unit 140c can include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d can implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 can receive map data, traffic information data, etc. from an external server. The autonomous driving unit 140d can generate an autonomous driving path and a driving plan from the obtained data. The control unit 120 can control the driving unit 140a such that the vehicle or the autonomous driving vehicle 100 can move along the autonomous driving path according to the driving plan (e.g., speed/direction control). In the middle of autonomous driving, the communication unit 110 can aperiodically/periodically acquire recent traffic information data from the external server and acquire surrounding traffic information data from neighboring vehicles. In the middle of autonomous driving, the sensor unit 140c can obtain a vehicle state and/or surrounding environment information. The autonomous driving unit 140d can update the autonomous driving path and the driving plan based on the newly obtained data/information. The communication unit 110 can transfer information about a vehicle position, the autonomous driving path, and/or the driving plan to the external server. The external server can predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 13:
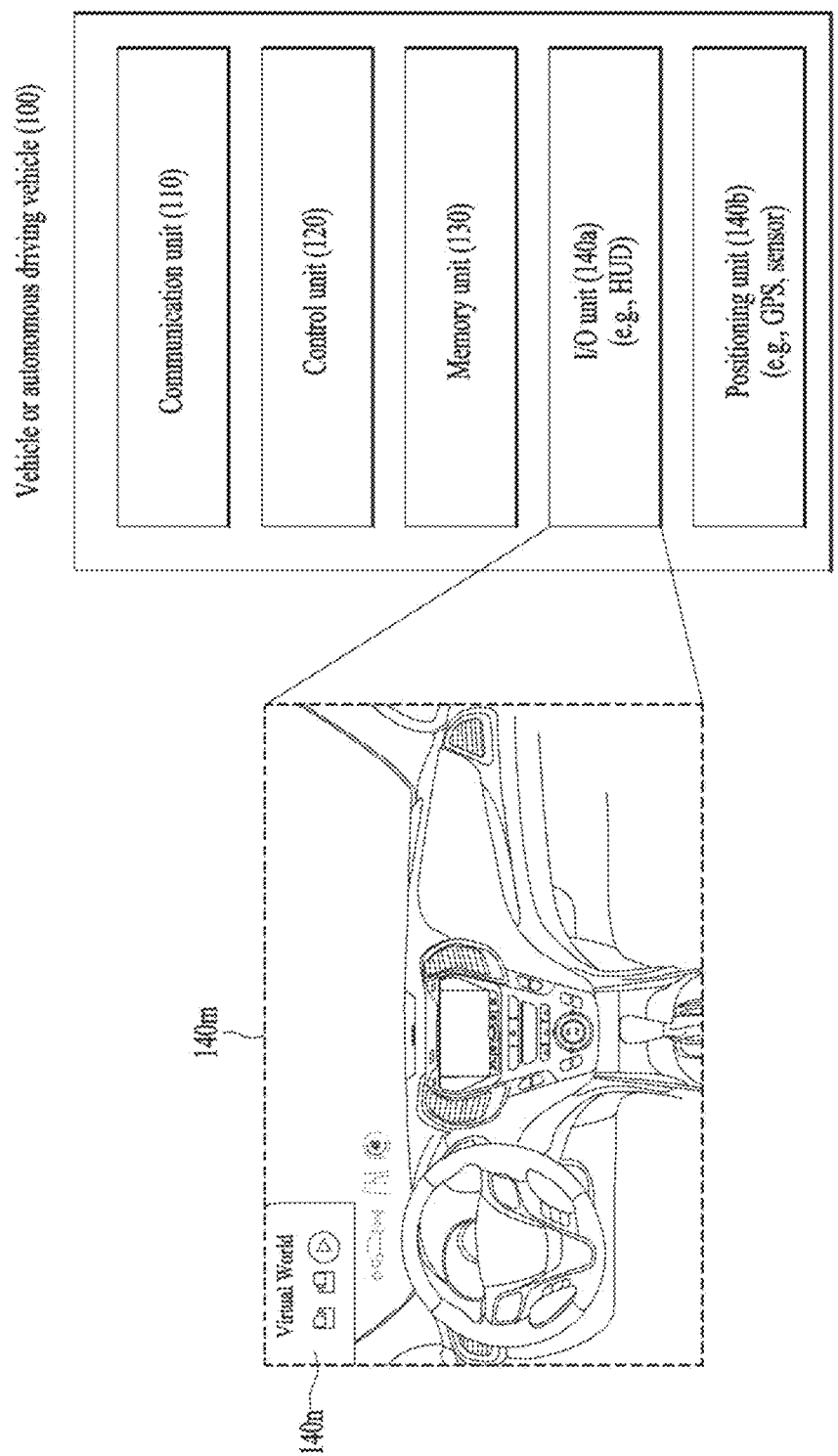

FIG. 13 illustrates a vehicle according to an embodiment of the present disclosure. The vehicle can be implemented as a transport means, an aerial vehicle, a ship, etc.

Referring to FIG. 13, a vehicle 100 can include a communication unit 110, a control unit 120, a memory unit 130, an I/O unit 140a, and a positioning unit 140b.

The communication unit 110 can transmit and receive signals (e.g., data and control signals) to and from external devices such as other vehicles or BSs. The control unit 120 can perform various operations by controlling constituent elements of the vehicle 100. The memory unit 130 can store data/parameters/programs/code/commands for supporting various functions of the vehicle 100. The I/O unit 140a can output an AR/VR object based on information within the memory unit 130. The I/O unit 140a can include an HUD. The positioning unit 140b can acquire information about the position of the vehicle 100. The position information can include information about an absolute position of the vehicle 100, information about the position of the vehicle 100 within a traveling lane, acceleration information, and information about the position of the vehicle 100 from a neighboring vehicle. The positioning unit 140b can include a GPS and various sensors.

As an example, the communication unit 110 of the vehicle 100 can receive map information and traffic information from an external server and store the received information in the memory unit 130. The positioning unit 140b can obtain the vehicle position information through the GPS and various sensors and store the obtained information in the memory unit 130. The control unit 120 can generate a virtual object based on the map information, traffic information, and vehicle position information and the I/O unit 140a can display the generated virtual object in a window in the vehicle (1410 and 1420). The control unit 120 can determine whether the vehicle 100 normally drives within a traveling lane, based on the vehicle position information. If the vehicle 100 abnormally exits from the traveling lane, the control unit 120 can display a warning on the window in the vehicle through the I/O unit 140a. In addition, the control unit 120 can broadcast a warning message regarding driving abnormity to neighboring vehicles through the communication unit 110. According to situation, the control unit 120 can transmit the vehicle position information and the information about driving/vehicle abnormality to related organizations.

INDUSTRIAL APPLICABILITY

The above-described embodiments of the present disclosure are applicable to various mobile communication systems.

What is claimed is:

1. A Road Side Unit (RSU) device for a wireless communication system, the RSU device comprising:
    a communication interface configured to transmit and receive messages with a server and a plurality of direct communication User Equipment (UE); and
    a controller configured to:
        receive a first vehicle-to-everything (V2X) service related information item from the server,
        in response to determining that signature processing is currently available for the first V2X service related information item, perform signature processing for the first V2X service related information item to generate first signature-processed V2X service related information and transmit the first signature-processed V2X service related information to one direct communication UE among the plurality of direct communication UE, and
        in response to determining that signature processing is currently unavailable for the first V2X service related information item, continue to collect a plurality of V2X service related information items from the server until signature processing becomes available and when signature processing become available, perform signature processing for the first V2X service related information item and the plurality of V2X service related information items as a group of V2X information to generate second signature-processed V2X service related information, and transmit the second signature-processed V2X service related information to the one direct communication UE.

2. The RSU device of claim 1, wherein the controller is further configured to:
    transmit the second signature-processed V2X service related information to the one direct communication UE as a single merged message.

3. The RSU device of claim 2, wherein the single merged message includes a value indicating a plurality of V2X service related information items exist in the single merged message, and
    wherein the single merged message includes an identifier and a value for each of the plurality of V2X service related information items in the single merged message.

4. The RSU device of claim 1, wherein the plurality of V2X service related information items include a Basic Safety Message (BSM) and a Personal Safety Message (PSM).

5. The RSU device of claim 1, wherein the controller is further configured to:
    transmit sensor detection information to the server.

6. The RSU device of claim 5, wherein the sensor detection information includes information of objects non-participating in a V2X service within a detectable range.

7. The RSU device of claim 5, wherein the sensor detection information is forwarded to a soft V2X UE through the server.

8. The RSU device of claim 1, wherein the server is a Soft V2X cloud server.

9. The RSU device of claim 1, wherein the one direct communication UE is an embedded device supportive of at least one of 5G PC5 interface or IEEE 802.11p.

10. The RSU device of claim 1, wherein the one direct communication UE corresponds to an On Board Unit (OBU).

11. The RSU device of claim 1, wherein the signature processing includes generating a signature based on an IEEE 1609.2 certificate.

12. The RSU device of claim 1, wherein the one direct communication UE includes at least one of a vehicle, a mobile terminal, a smart phone, a laptop, a home appliance, or a drone.

13. The RSU device of claim 1, wherein the controller is further configured to:
    collect V2X service related information items from the server on a predetermined periodic interval.

14. The RSU device of claim 1, wherein the controller is further configured to:
    transmit signature-processed V2X service related information to the one direct communication UE within a predetermined delay period after receipt of V2X service related information from the server.

15. The RSU device of claim 1, wherein the controller is further configured to:
    periodically request V2X service related information from the server according to a predetermined time interval.

16. The RSU device of claim 1, wherein the controller is further configured to:
    send signature-processed V2X service related information to the plurality of direct communication UE within a predetermined subscription area of the RSU device.

17. A method of operating a Road Side Unit (RSU) device, the method comprising:

receiving, by a controller in the RSU device, a first vehicle-to-everything (V2X) service related information item from a server;

in response to determining, by the controller, that signature processing is currently unavailable for the first V2X service related information item, continue collecting a plurality of V2X service related information items from the server until signature processing becomes available; and in response to signature processing becoming available, performing signature processing for the first V2X service related information item and the plurality of V2X service related information items as a group of V2X information to generate signature-processed V2X service related information and transmitting the signature-processed V2X service related information to a direct communication User Equipment (UE).

18. The method of claim 17, further comprising:

in response to determining, by the controller, that signature processing is currently available for the first V2X service related information item, performing signature processing for the first V2X service related information item to generate one signature-processed V2X service related information item and transmitting the one signature-processed V2X service related information item to the direct communication UE.

19. The method of claim 17, further comprising:

periodically requesting V2X service related information from the server according to a predetermined time interval.

20. A server in a wireless communication system, the server comprising:

a communication interface configured to transmit and receive messages with a Road Side Unit (RSU) device and a plurality of direct communication User Equipment (UE); and a controller configured to:
  receive vehicle-to-everything (V2X) service related information from one direct communication UE among the plurality of direct communication UE; and
  transmit the V2X service related information to the RSU device, wherein a plurality of V2X service related information items including the V2X service related information are collected by the RSU device based on signature processing not being currently available for the plurality of V2X service related information items, and wherein the plurality of V2X service related information items are signed after the signature processing becomes available.

\* \* \* \* \*